(12) United States Patent
Dalglish et al.

(10) Patent No.: US 10,929,906 B2
(45) Date of Patent: Feb. 23, 2021

(54) METHOD AND SYSTEM FOR MANAGING GROUP ORDERS FROM THIRD PARTY RETAIL SHOPS

(71) Applicant: Transmarketing, Inc., Inver Grove Heights, MN (US)

(72) Inventors: Michael Dalglish, Inver Grove Heights, MN (US); Matthew Vogel, St. Paul, MN (US)

(73) Assignee: GROUP ORDER, LLC, Inver Grove Heights, MN (US)

( * ) Notice: Subject to any disclaimer, the term of this patent is extended or adjusted under 35 U.S.C. 154(b) by 121 days.

(21) Appl. No.: 16/145,939

(22) Filed: Sep. 28, 2018

(65) Prior Publication Data
US 2019/0130465 A1 May 2, 2019

Related U.S. Application Data
(60) Provisional application No. 62/564,698, filed on Sep. 28, 2017.

(51) Int. Cl.
| | |
|---|---|
| *G06Q 30/00* | (2012.01) |
| *G06Q 30/06* | (2012.01) |
| *G06Q 20/32* | (2012.01) |
| *G06Q 50/12* | (2012.01) |
| *G06Q 20/22* | (2012.01) |
| *G06Q 50/00* | (2012.01) |
| *G06Q 20/20* | (2012.01) |
| *G07F 17/40* | (2006.01) |

(52) U.S. Cl.
CPC ....... *G06Q 30/0613* (2013.01); *G06Q 20/202* (2013.01); *G06Q 20/22* (2013.01); *G06Q 20/322* (2013.01); *G06Q 30/0641* (2013.01); *G06Q 50/01* (2013.01); *G06Q 50/12* (2013.01); *G07F 17/40* (2013.01)

(58) Field of Classification Search
CPC .................................................. G06Q 30/0613
See application file for complete search history.

(56) References Cited

U.S. PATENT DOCUMENTS
| | | | | |
|---|---|---|---|---|
| 9,754,331 B1* | 9/2017 | Beckelman | ............ | G06Q 10/10 |
| 2012/0290414 A1* | 11/2012 | Harman | ................. | G06Q 50/12 |
| | | | | 705/15 |

OTHER PUBLICATIONS
Heo, Cindy Yoonjoung. "Exploring group-buying platforms for restaurant revenue management." International Journal of Hospitality Management 52 (2016): 154-159.*

* cited by examiner

*Primary Examiner* — Kathleen Palavecino
(74) *Attorney, Agent, or Firm* — Merchant & Gould P.C.

(57) ABSTRACT

Managing orders from third party retail shops that includes: storing one or more predetermined orders for each of a plurality of users of a platform service, each of the predetermined orders including a product selection for the user associated with a particular third party retail shop; receiving, from a user of the platform service, a selection of one or more of the plurality of users; receiving, from the user, a selection of the third party retail shop from among a plurality of third party retail shops; and after receiving both (1) the selection of the third party retail shop and (2) the one or more users, generating an order including the product selection associated with the selected third party retail shop for each of the selected one or more users.

19 Claims, 10 Drawing Sheets

METHOD AND SYSTEM FOR MANAGING GROUP ORDERS FROM THIRD PARTY RETAIL SHOPS

CROSS-REFERENCE TO RELATED APPLICATIONS

This application claims priority to U.S. Provisional Application Ser. No. 62/564,698, filed Sep. 28, 2017 and entitled "Method and Systems for Managing Group Orders From Third Party Retail Shops," the disclosure of which is incorporated herein by reference in its entirety.

TECHNICAL FIELD

The present disclosure relates generally to an ordering process, and in particular, to methods and systems for managing group orders from third party retail shops.

BACKGROUND

There are many situations in which groups of individuals wish to order items at a common time from the same third party retail shop. One example of such a scenario is in a business setting, in which a group of coworkers wishes to order a meal from the same restaurant for take-out. Such a group of individuals may nominate a single individual who will then take orders from the group, go to the restaurant, order for the entire group, pay for the meal for all coworkers, and then distribute the orders to his/her coworkers, and optionally organize payment (if that ordering individual is not paying for the orders, or if payment is not otherwise drawn from a common/group account. In an additional scenario, a group of students on a field trip or attending an athletic event may stop for a meal on a way to/from such an event, and a chaperone may organize meal ordering.

In each of these scenarios, many complications occur throughout the many steps performed. For example, the individual designated to order for others needs to obtain an order from each of the other individuals (either in person or by phone/text/email/etc.) and accurately aggregate each order into a complete order. Furthermore, the individual would need to order each other person's items on a person-by-person basis, since the orders are not aggregated, and would need to keep track of each order individually. Additionally, because the other individuals would either provide their orders in person or via electronic communication means, the various orders might be distributed across various communication systems, may not be written down, or difficult to decipher (e.g., if handwritten). Furthermore, in scenarios where individuals order the same thing from a particular location, each time that individual is part of an ordering group, that individual must not only indicate that they wish to participate in a group order, but must also provide their specific order to the individual coordinating orders. Overall, these difficulties dissuade individuals from volunteering to coordinate orders.

Not only does such an ordering scenario present difficulties at the user level, it presents complexities technically as well. As noted above, because orders are received across various communication mechanisms, orders are often lost, leading to inefficiency at the point of sale. Furthermore, even repeated orders are not stored in any centralized location, so even if one individual knows that they always order the same thing from a particular third party (e.g., restaurant), that information might, at best, be known by 1-2 others and not the entire group of potential order-coordinating individuals, so a person's "standing order" or "usual" order, might not be known to the order coordinator, resulting in communication inefficiencies. There is also no readily accessible way to integrate communications from a third party retail shop, for example to communicate to an entire group any specific specials or sales offered by an intended third party retail shop that might affect individuals' order selections.

SUMMARY

In accordance with the following disclosure, the above and other issues are addressed by the following:

In a first aspect, a method of managing orders from third party retail shops that includes: storing in a database one or more predetermined orders for each of a plurality of users of a platform service, each of the one or more predetermined orders including a product selection for the user associated with a particular third party retail shop from among a plurality of third party retail shops; receiving, from a user of the platform service, a selection of one or more of the plurality of users; receiving, from the user, a selection of a third party retail shop from among the plurality of third party retail shops included in the platform; and after receiving both (1) the selection of the third party retail shop and (2) the one or more users, generating an order including the product selection associated with the selected third party retail shop for each of the selected one or more users.

In a second aspect, a method of coordinating orders from a third party retail shop for a plurality of user contacts is disclosed. The method includes displaying a user interface including a plurality of users of a platform service on a mobile device of a user, and transmitting, from the mobile device of a user to a platform service, a selection of one or more of the plurality of users of the platform service. The method also includes displaying a user interface including a plurality of third party retail shops included in the platform service, and transmitting, from the mobile device of the user to the platform service, a selection of a third party retail shop from among a plurality of third party retail shops included in the platform service. The method includes receiving an order including a previously-selected product associated with the selected third party retail shop for each of the selected one or more users based on information in a database, without requiring each of the selected one or more associated users to re-enter the product after the selection of the third party retail shop by the user.

In a third aspect, a mobile device comprising a programmable circuit and a memory communicatively connected to the programmable circuit is disclosed. The mobile device memory stores instructions which, when executed by the programmable circuit, cause the mobile device to: display a user interface including a plurality of users of a platform service on a mobile device of a user; transmit, from the mobile device of a user to a platform service, a selection of one or more of the plurality of users of the platform service; display a user interface including a plurality of third party retail shops included in the platform service; transmit, from the mobile device of the user to the platform service, a selection of a third party retail shop from among a plurality of third party retail shops included in the platform service; and receive an order including a previously-selected product and one or more customizations associated with the selected third party retail shop for each of the selected one or more users based on information in a database, without requiring each of the selected one or more associated users to re-enter the product or the one or more customizations after the selection of the third party retail shop by the user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

As briefly described above, embodiments of the present invention are directed to systems and methods to establish a platform service, which is accessible to a plurality of users through any number of various computing devices, that enables each user to identify and store a preferred product selection at a particular third party retail shop and, optionally, include user preferred customization options to the product. The platform service further enables users of the platform to define a group of users and, based on the defined group, generate a combined order reflecting the preferred product selections of the users in the group for a particular retail shop; the combined order can additionally include the customizations of the preferred product selection. The combined order can then be placed in person at the retail shop or submitted electronically to the retail shop.

Figure 1:
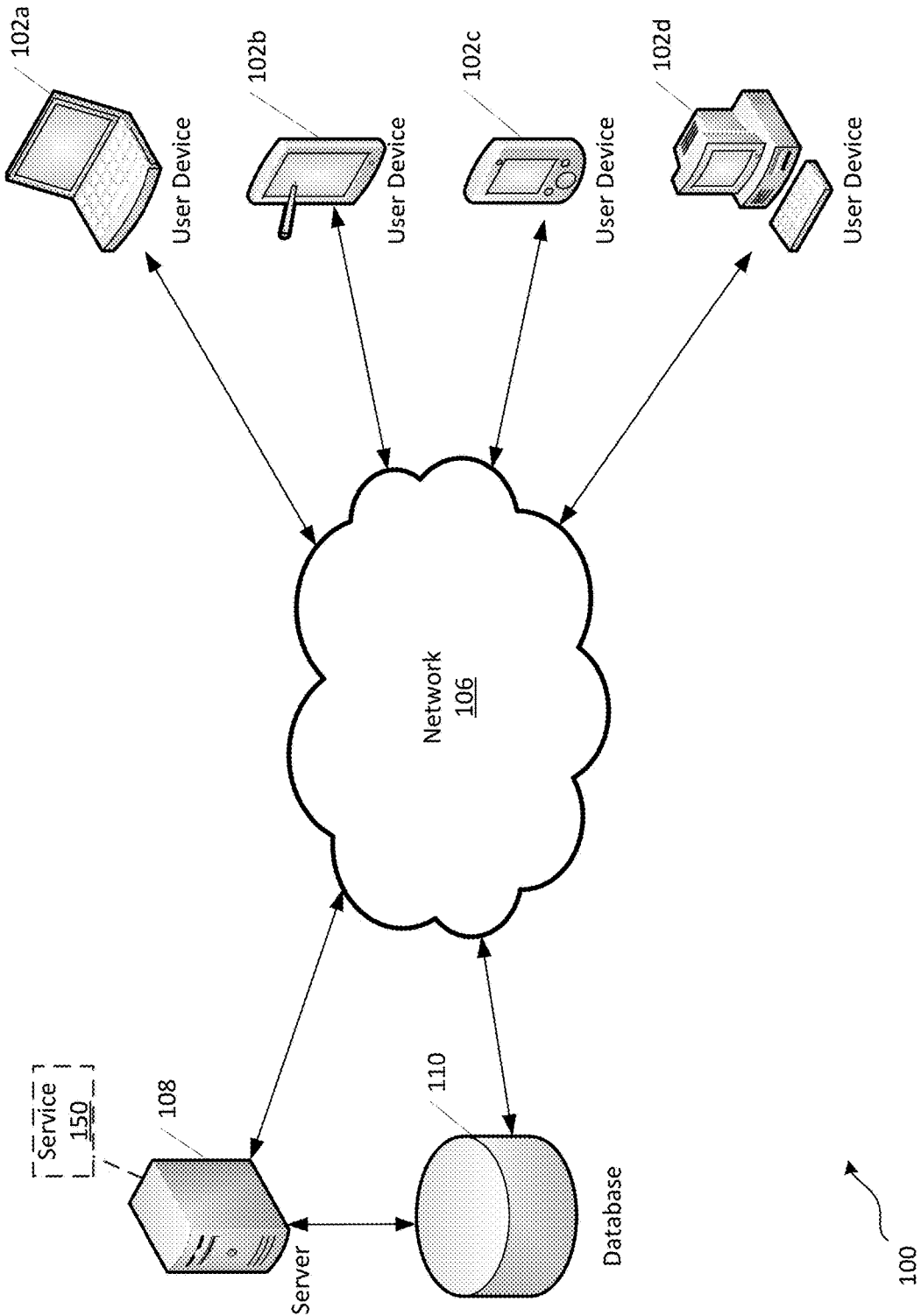
FIG. 1 illustrates an example platform in which a platform service for managing group orders from third party retail shops can be implemented.

FIG. 1 illustrates an example platform 100 to institute the management of group orders from third party retail shops. The platform 100 can include various user devices, e.g., laptop 102a, tablet 102b, smart phone 102c, desktop 102d or any other type of user-accessible computing device, as well as one or more servers 108 and databases 110, all of which can communicate through a wired or wireless network 106. The platform 100 provides the base upon which a platform service 150 for the management of group orders from third party retail shops can run. Further detail regarding the components of user devices are discussed with reference to FIG. 12

For ease of understanding, the remaining figures of the present disclosure illustrate the operation of the platform service 150 for the management of group orders from third party retail shops in the context of third party restaurants. However, it is to be understood that use of the platform service 150 is not limited to restaurants but should be recognized as being applicable to any of various other types of third party shops including, but not limited to, for example, sporting goods stores, clothing stores, movie theatres, or other types of shops at which groups of potential customers may typically desire to place orders at the same time.

Figure 2:
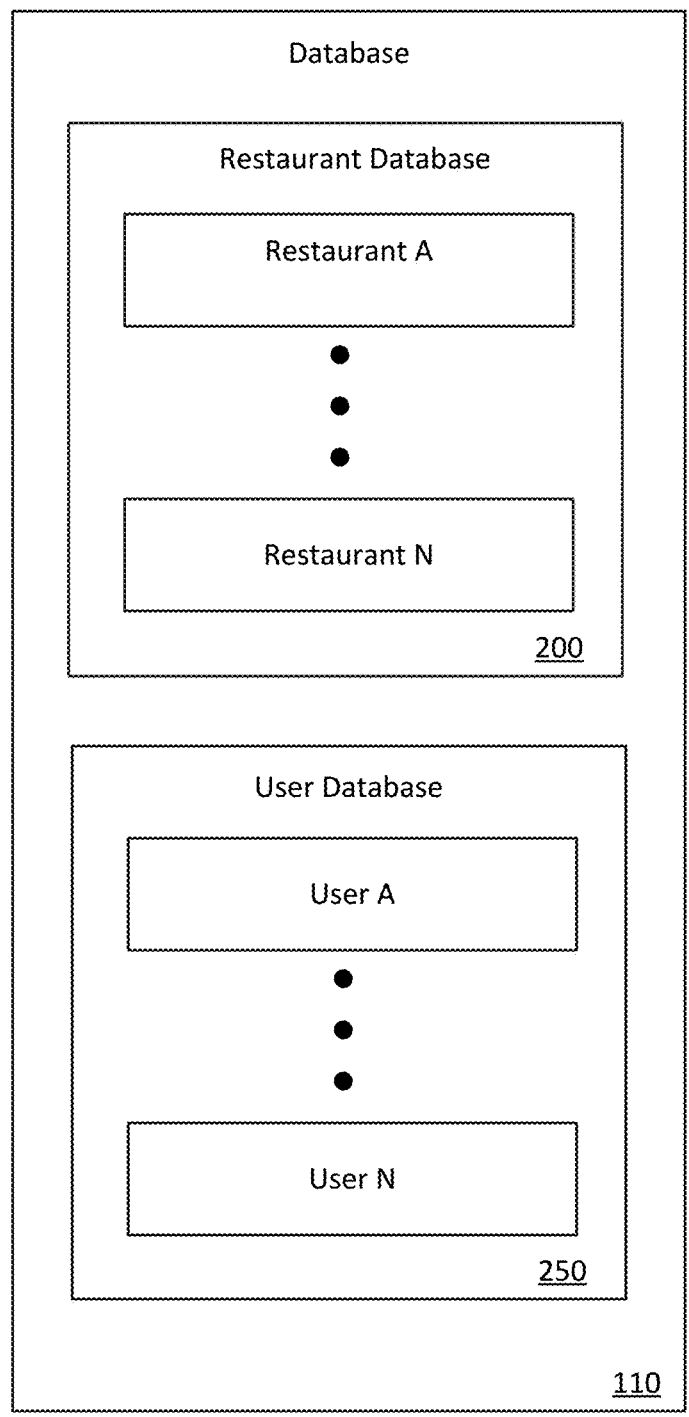
FIG. 2 illustrates a database usable with the platform service of the present disclosure.

As noted above, the platform service 150 for the management of group orders from third party retail shops utilizes the database 110. Referring to FIG. 2, the database 110 generally includes both a restaurant database 200 and a user database 250. The restaurant database 200 stores data on a plurality of restaurants including their offered product selections and options for customizing those product selections; simplified examples of the types of information found in restaurant database 200 are found in FIGS. 3 and 4 described below. The user database 250 stores data related to the identity and/or contact information of the user, as well as the preferred product selection of the user for various restaurants and the various groups in which the user resides; a simplified example of the type of information found in user database 250 is found in FIG. 5 described below.

Figure 3:
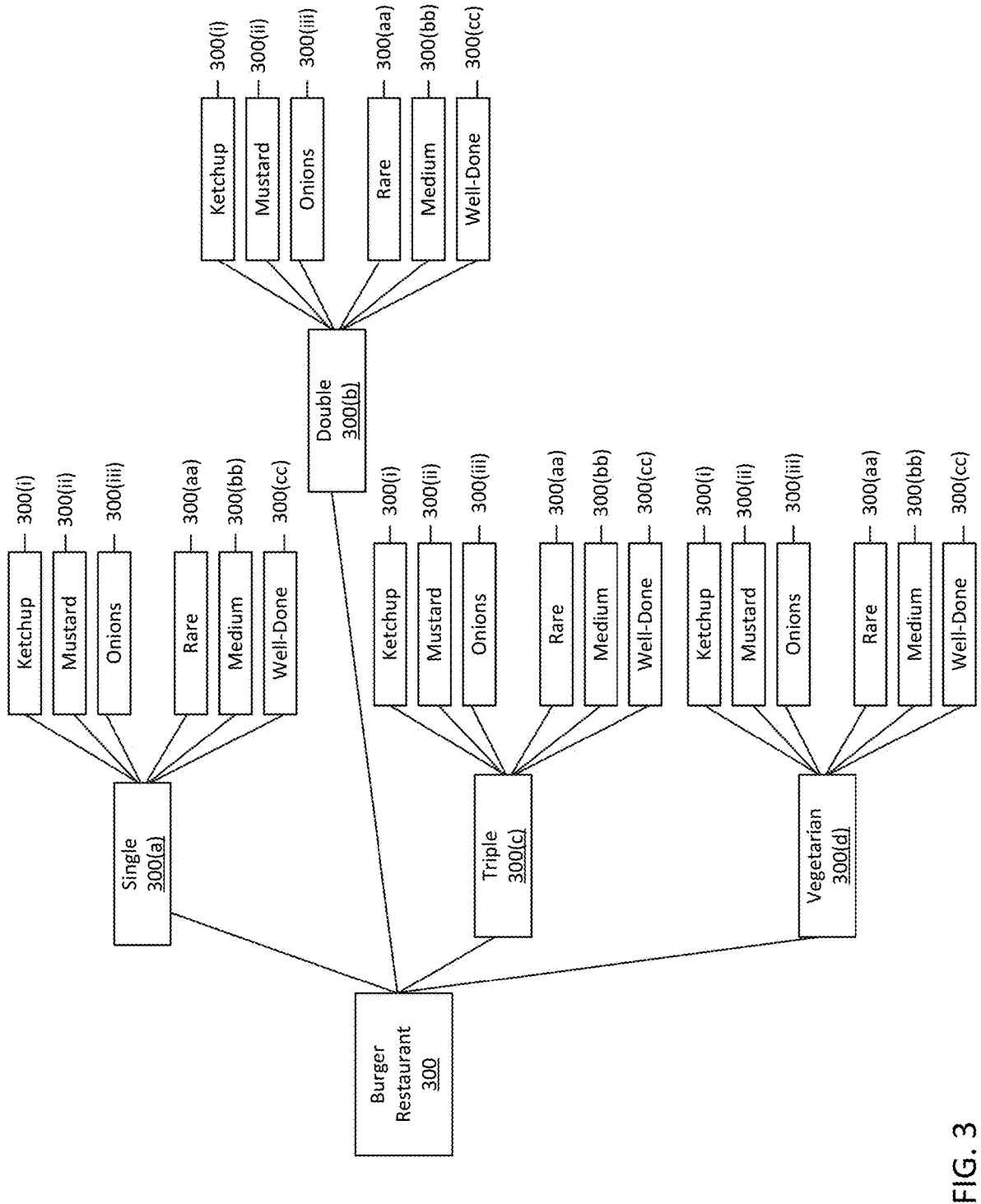
FIGS. 3-4 are examples of third party retail restaurant data usable with the platform service of the present disclosure.
Figure 4:
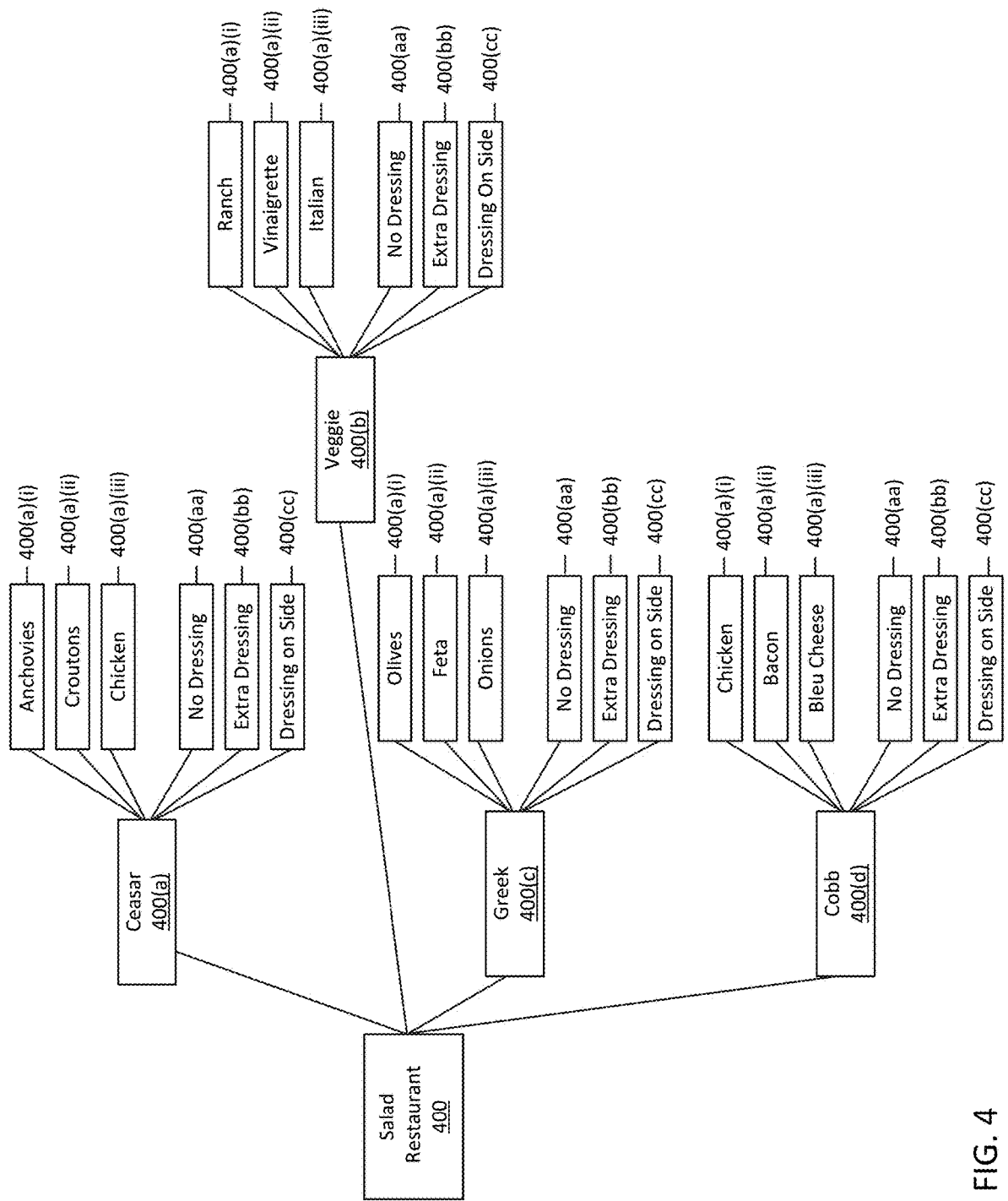

FIGS. 3 and 4 illustrate simplified examples of the type of data that can be stored in the restaurant database 200 for a burger restaurant 300 (see FIG. 3) and a salad restaurant 400 (see FIG. 4). The examples of FIGS. 3 and 4 provide a minimal number of datum for illustration purposes. However, it should be recognized that numerous other user-selectable menu items and user-selectable options (ingredients, preparation, serving utensils, etc.) as well as costs or other factors pertinent to the menu items can be stored in various layers of relational data in the restaurant database 200.

It is noted that, in alternative embodiments, the database 200 may store less than the entire collection of data from each of the restaurants. For example, in an example embodiment, the database 200 stores a list of restaurant identifiers, and can access menu information from a remote database, either controlled by the same entity as that of the platform 100, or a separate entity such as the restaurant owner or other third party. In such embodiments, the restaurant database 200 can store information associated with the restaurants participating in the platform service 150, but may not store all menu information for those restaurants due to frequency of update of such information, and a lack of mechanism for notifications regarding such updates. As such, the platform service 150 may also include an interface to a third party menu service for accessing menu items for the restaurant participants in the restaurant database. The interface to the third party menu service may be an aggregator of menu items, or may be specific to a particular one or more restaurants. As such, more than one such interface may be used, depending on the participation of restaurants in such an aggregator and in the platform service 150.

Referring to FIG. 3, the burger restaurant 300 offers a product selection of: a single patty burger 300a; a double patty burger 300b, a triple patty burger 300c, and a vegetarian burger 300d. In relation to each of the product selections, the restaurant database 200, also stores user-selectable options for customizing the product selection. For example, for each of the burger selections 300a, 300b, 300c, and 300d, user selectable options of toppings such as ketchup 300(i), mustard 300(*ii*), and onions 300(*iii*) are stored, and user-selectable preparation options such as rare 300(*aa*), medium 300(*bb*), and well-done 300(*cc*) are also stored.

In the example of FIG. 4, the salad restaurant 400 offers a product selection of: Caesar salad 400*a*; a veggie salad 400*b*, a Greek salad 400*c*, and a Cobb salad 400*d*. In relation to each of the product selections, the restaurant database 200, also stores user-selectable options for customizing the product selection. For example, in relation to the Caesar salad 400(*a*) the restaurant database 200 stores the options for adding/deleting anchovies 400(*a*)(*i*), croutons 400(*a*)(*ii*), and chicken 400(*a*)(*iii*). In relation to the veggie salad 400(*b*), the restaurant database stores the options for dressing selections, e.g., ranch 400(*b*)(*i*), vinaigrette 400(*b*)(*ii*), and Italian 400(*b*)(*iii*). In relation to the Greek salad 400(*c*), the restaurant database 200 stores the options for adding/deleting items, e.g., olives 400(*c*)(*i*), feta 400(*c*)(*ii*), and onions 400(*c*)(*iii*). In relation to the cobb salad 400(*d*), the restaurant database 200 stores the options for adding/deleting items, e.g., chicken 400(*d*)(*i*); bacon 400(*d*)(*ii*); and bleu cheese 400(*d*)(*iii*). Further, each of the menu items also provides for storing in the restaurant database 200, the user-selectable options of no dressing 400(*aa*), extra dressing 400(*bb*) and dressing one the side 400(*cc*).

Figure 5:
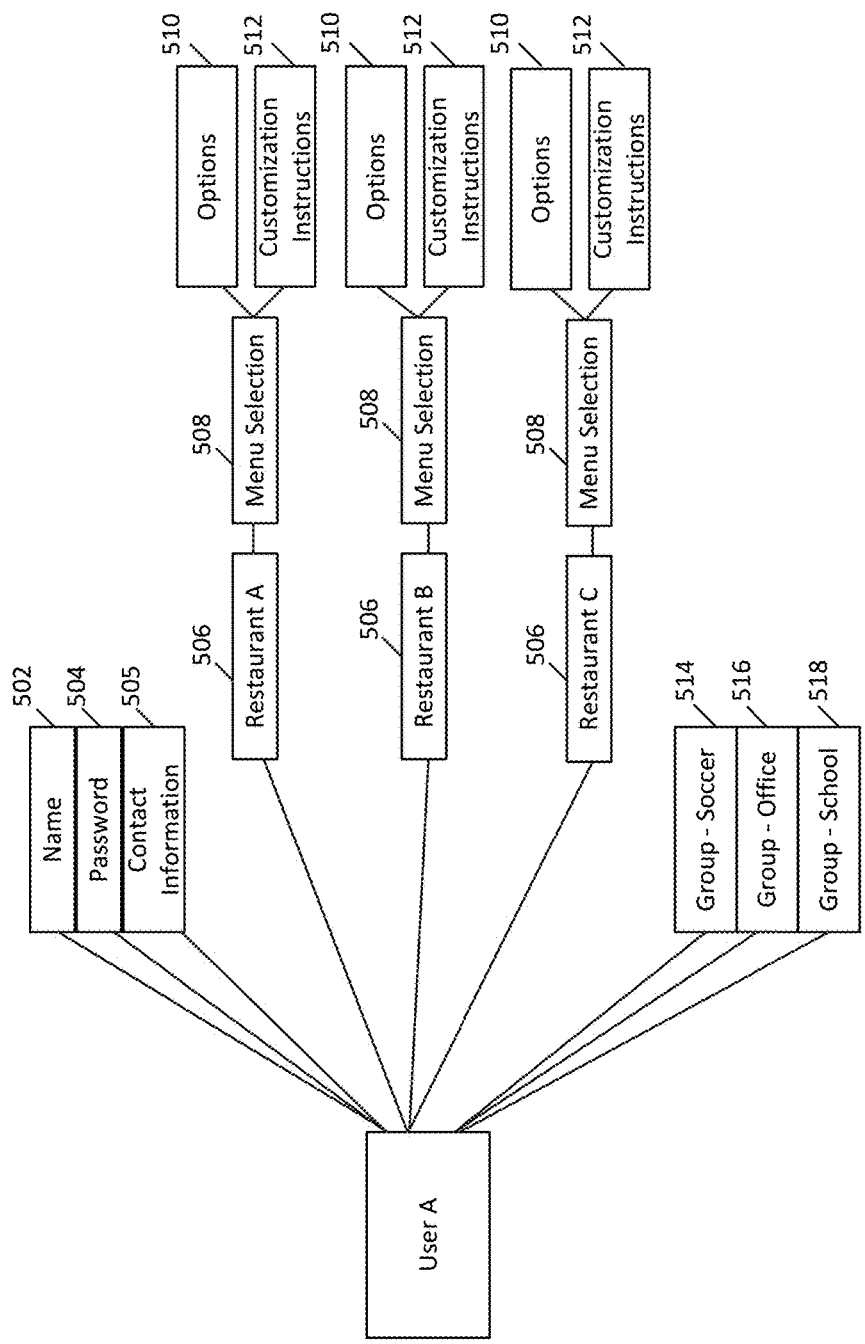
FIG. 5 is an example of user data usable with the platform service of the present disclosure.

FIG. 5 illustrates a simplified example of the type of data the can be found in the user database 250 for any number of users and, in this instance, a specific User A. As shown, the user database 250 stores the user's name 502, a user password 504, as well as the user's contact information 505, e.g., cell phone number or e-mail address; other data for identifying the user can also be stored, for example, their home and/or office address. The user database 250 also stores the names 506 of the restaurants for which the user has chosen to identify a specific menu selection 508, which can include a single item, e.g., a burger, or a plurality of items, e.g. a burger, fries, a drink, and dessert; the user database 250 further stores any options 510 related to the menu selection 508 such as, for example, whether to include anchovies on a salad or put ketchup on a burger order, etc., as well as, optionally, any customization instructions 512, such as, for example, to put the salad dressing on the side, include some silverware, etc. The user database 250 also stores the ordering groups, e.g., the soccer ordering group 514, the office ordering group 516, and the school ordering group 518, to which the user belongs. Further details on ordering groups are provided with reference to the flowchart of FIG. 9. As with the examples of FIGS. 3 and 4, FIG. 5 provides a minimal number of datum for illustration purposes. However, it should be recognized that numerous other user identifiers and/or contact information, restaurants, menu selections, options, customization instructions, costs, user groups and other relevant data can also be stored various layers of relational data in the user database 250.

Such storage of data and relationships among data, including the linkage between different users, each user and specific restaurants and order preferences at those restaurants, allows for improved efficiency of data storage and communication among users, for a variety of reasons. For example, maintaining these correspondences in the user database 250 allows for creation of group orders without requiring presentation of options to each user (which that user may not remember at a time of ordering) or requesting that each user newly-enter information associated with an order at each time the user wishes to join a group order.

Figure 6:
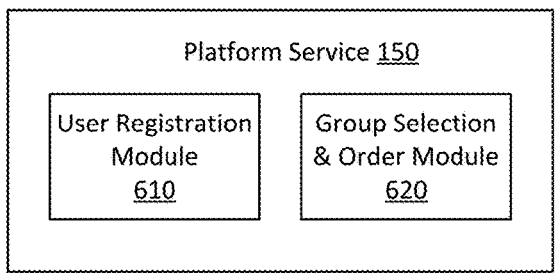
FIG. 6 is block diagram illustrating an example configuration of software modules usable with the platform service of the present disclosure.

Referring to FIG. 6, the platform service 150 for the management of group orders from third party retail shops includes various programming modules including a user registration module 610 as well as a group selection and order module 620.

Figure 7:
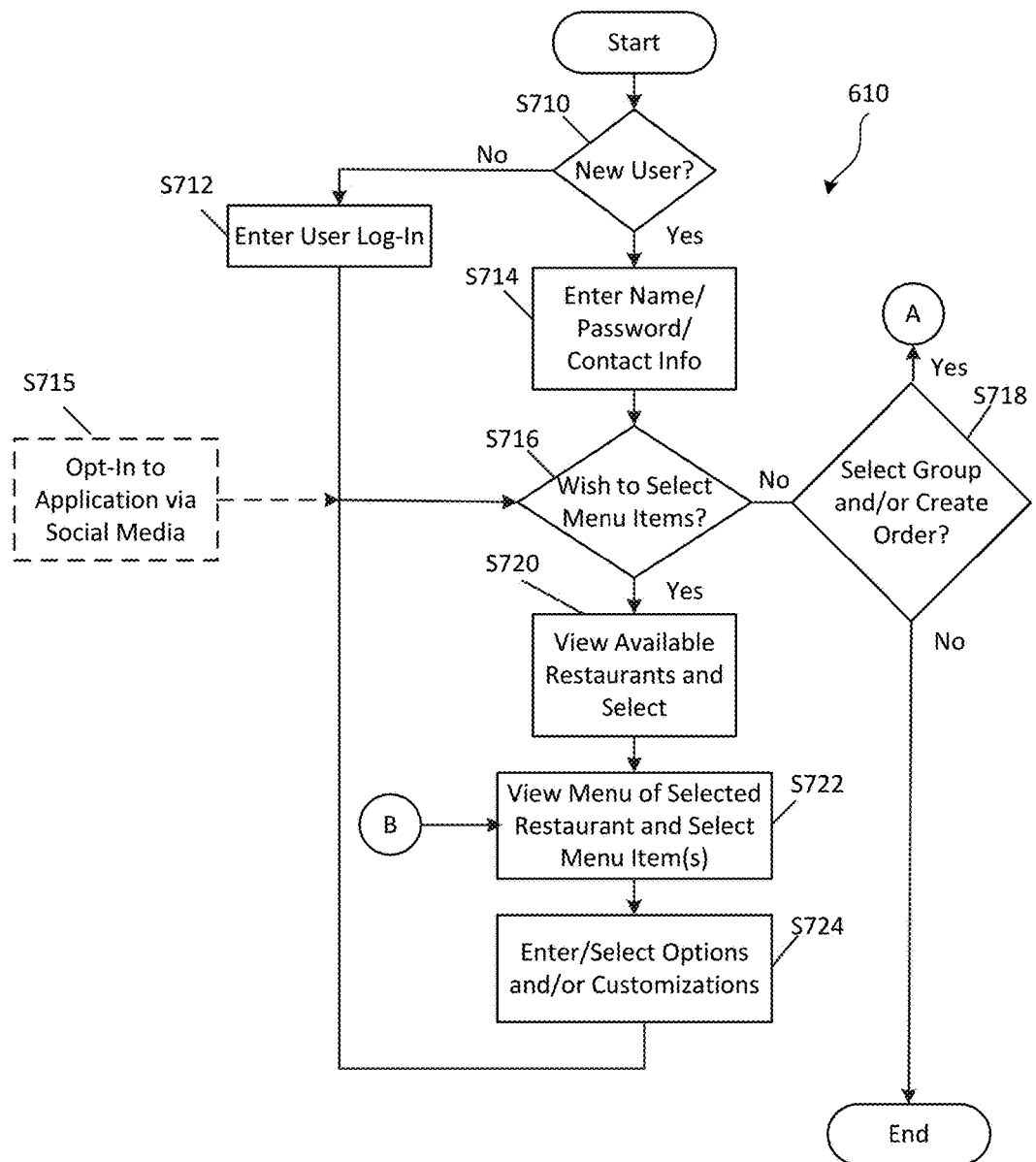
FIG. 7 is a flowchart illustrating example operations of user registration module usable with the platform service of the present disclosure.

The flowchart of FIG. 7 illustrates the operation of the user registration module 610. As shown, the operation begins by querying the user as to whether they are a new user, S710. If the user is a new user, S710:YES, the user is requested to enter their name (and/or username), a password and their contact information, e.g., cell phone number and/or e-mail address, S714; the user information is stored to user database 250. If the user is not a new user, S710:NO, the user is requested to enter their log-in information, e.g. username and password. In certain embodiments, the user may opt in to use the platform service 150 through an offering on a social media network (e.g., Facebook, Twitter, Google+, etc.), S715. User information already present in the social media network can be used to populate the user's name, password and/or contact information in the platform service 150, or the user may be prompted to enter the data. The offering on the social media network may come from an existing circle of friend, from a restaurant, or from the platform service 150 itself Once established, the user is then queried as to whether they wish to select menu items from a restaurant, S716. If the user does not wish to select menu items from a restaurant, S716:NO, the user is queried as to whether they would like to make a group selection and/or create an order, S718. If the user would like to make a group selection or create an order, S718:YES, operation is transferred to the group selection and order module 620 at item A. If the user would not like to make a group selection but would still like to place an order, S718:YES, operation is transferred to the group selection and order module 620 at item A. If user does not wish to make a group selection or create an order, S718:NO, operation of the user registration module 610 ends.

Figure 8:
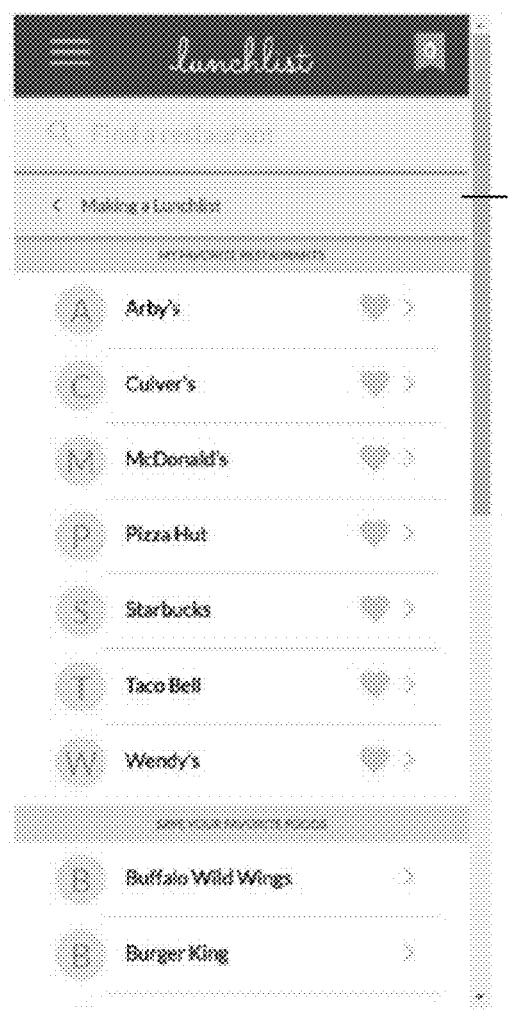
FIG. 8 is an example of a user-interface display usable with the platform service of the present disclosure.

If the user does wish to select menu items from a restaurant, S716:YES, the user is provided with a listing of restaurants from which to select, e.g. those restaurants stored in restaurant database 250, S720. Alternatively, or in addition to, providing the user with a listing of restaurants from which to select, the user may enter the name of a restaurant or use a global positioning system (GPS) function to provide a map of nearby restaurants from which to select FIG. 8 illustrates an example user-interface display 800 wherein a listing of restaurants 802 found in the restaurant database 200 is displayed. The restaurants can be displayed in alphabetical order, in order by type of food served (e.g., American, Italian, Thai, etc.); in order of nearness in location to the user, user-designated favorites, or other desirable orders. The order of display can be set by an administrator of the platform service 150 or by user preferences. The user-interface display 800 also illustrates a query field 804 for user-entry of a restaurant name.

Returning once again to FIG. 7 and operation of the user registration module 610, upon selection of a restaurant, S720, (or upon finding that a user-entered name or named selected from the GPS map is in the restaurant database 200) the user is provided with a listing of the products, or menu items, that are offered by the restaurant and from which the user may select, S722. In certain embodiments, the user may enter the name of and search for a specific item from the selected restaurant, and/or other restaurants. Upon selection or entry of one or more menu items, S722, the user is provided with the opportunity select or enter options related to the menu items and/or select or enter customized instructions related to the menu items, S724. The user's selections are stored to the user database 250. Subsequently, the user is once again queried as to whether they would like to select menu items from another restaurant, S716. Once again, if the user would like to make a group selection or create an order, S718:YES, operation is transferred to the group selection and order module 620 at item A. If the user would not like to make a group selection but would still like to place an order, S718:YES, operation is transferred to the group selection and order module 620 at item A. If user does not wish to make a group selection or create an order, S718:NO, operation of the user registration module 610 ends.

Figure 9:
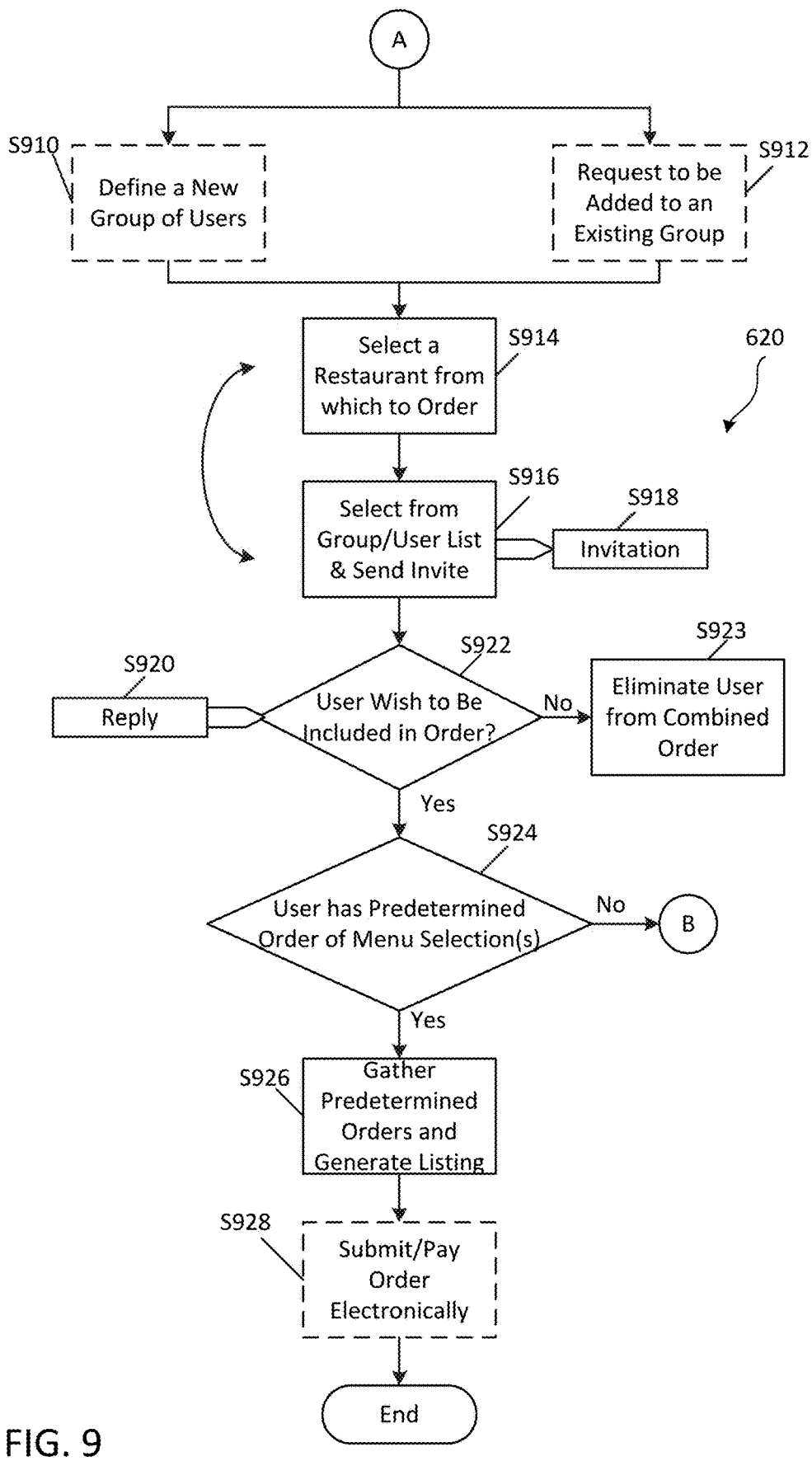
FIG. 9 is a flowchart illustrating example operation of a group selection and ordering module usable with the platform service of the present disclosure.

The flowchart of FIG. 9 illustrates the operation of the group selection and order module 620 of the platform service 150 for the management of group orders from third party retail shops. A user reaches the group selection and order module 620 via item A of the user registration module 610. Upon entering the group selection and order module 620, the user can optionally define one or more group of users that can include or omit themselves, S910. This feature is particularly useful in a situation where a plurality of users reside in a common location. For example, an individual who is a soccer coach might establish a group for his soccer team, or that same individual might establish a group with co-workers in his work, or that same individual might be a college student who wishes to establish a group for individuals on a dorm floor. These groups may already be established via a social media network and can be imported into the application 150. Alternatively, the user can optionally request to be added to an existing group, S912; the request can be approved or denied by the group creator, an existing member of the group, and/or an application administrator.

Figure 10:
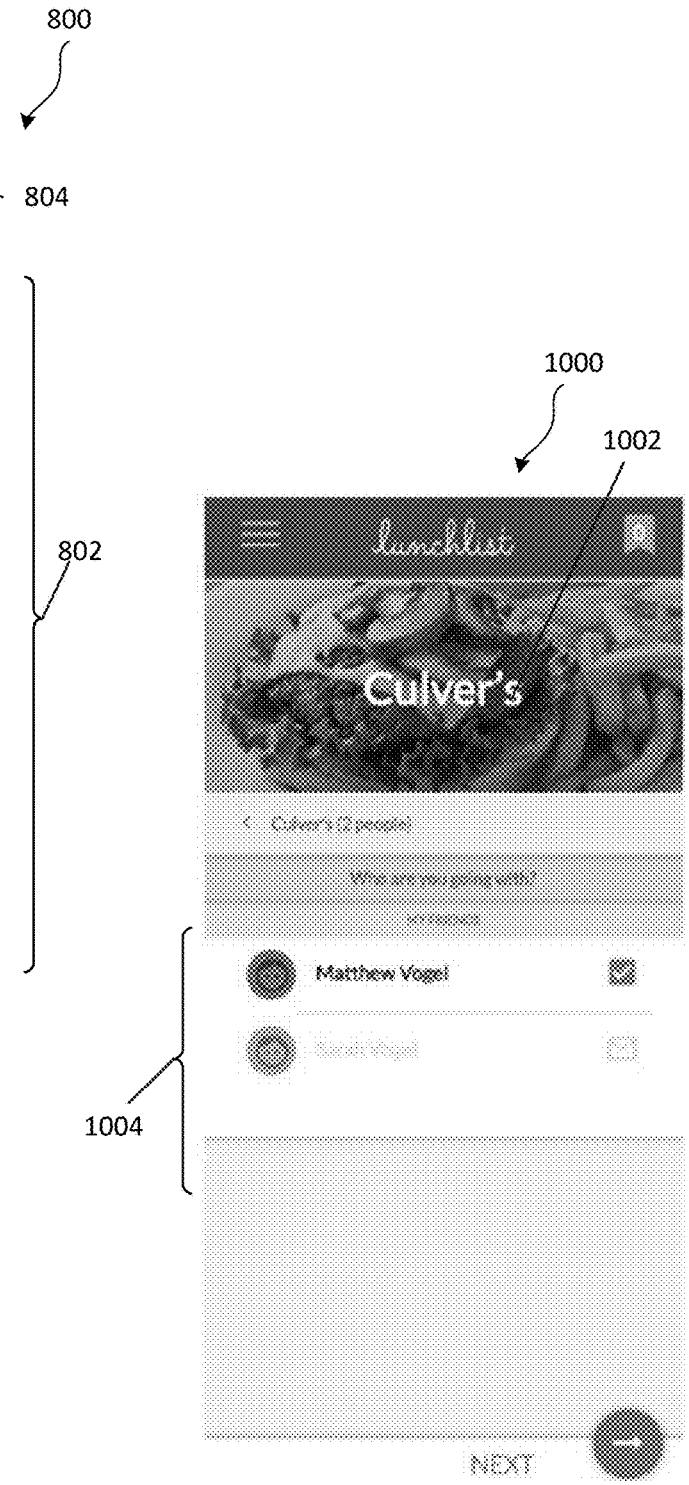
FIG. 10 is an example of a user-interface display usable with the platform service of the present disclosure.

If the user utilizes one of the group operations, e.g. S910 or S912, or chooses to bypass these operations, the group selection and order module 620 presumes the user wishes to create a combined order and subsequently prompts the user to select a restaurant from which to order, S914. Upon selection of a restaurant, S914, the user is presented with a list of groups and/or individual users from which to invite into placing a combined order of menu items from the selected restaurant, S916. In certain embodiments, the user can perform operations S914 and S916 in reverse order by selecting those individuals the user wishes to invite first and the restaurant second. FIG. 10 illustrates an example user-interface display 1000 wherein in the user's selected restaurant is identified, e.g. name 1002, and a list of users 1004 from which to select is provided.

Upon selecting a group of users and/or one or more individual users, S916, the group selection and order module 620, operates to optionally transmit an invitation S918 to the selected users via text and/or e-mail and/or app notification based on the user's contact information stored in the user database 250. The invited user's, in turn, optionally send a reply S920 to the invitation S918. If the user chooses not to reply to the invitation, then the originating user has the ability to process the order and choose whether or not to include the invited user. In certain embodiments, if a restaurant has not been selected by the user that is the order originator, the invitation can invite the receiver of the invitation to vote on a list of restaurants from which to order or to enter/select a restaurant the receiver of the invitation would like to order from. In a further example, if the restaurant has not been selected by the user that is the order originator, that user can be presented a number of restaurants based on the users selected and invited, e.g., among those restaurants for which the selected users have preselected orders.

In an example embodiment, a timer can be implemented with which, if no restaurant is selected within a predetermined period of time, a restaurant is selected for the user. This has a benefit of reducing indecision of the user with respect to restaurant choice.

If the user does not wish to be included in the combined order at the selected restaurant, S922:NO, the declining user is eliminated from the combined order, S923. If the user does wish to be included in the combined order at the selected restaurant, the group selection and order module 620 operates to determine if the replying user has a predetermined menu selection (which can additionally include options and/or customized instructions) stored in the user database 250 that can be included in the combined order, S924. If the replying user, does not have a predetermined menu selection, S924:NO, the replying user is directed back to the user registration module 610 (see FIG. 7) at item B for selection and storage of their menu items. If the replying user does have a predetermined menu selection, S924:YES, the group selection and order module 620 adds the predetermined to the combined order and displays the generated combined order to the user that originated the order, S926. In certain embodiments, the combined order is also visible to the users whose orders are included in the combined order. The combined order includes for each ordering user their predetermined order, e.g. one or more menu items (as well as options and/or customized instructions relating to the menu items if stored in user database 250); the combined order can additionally include a combined cost as well as cost for each individual order.

Figure 11:
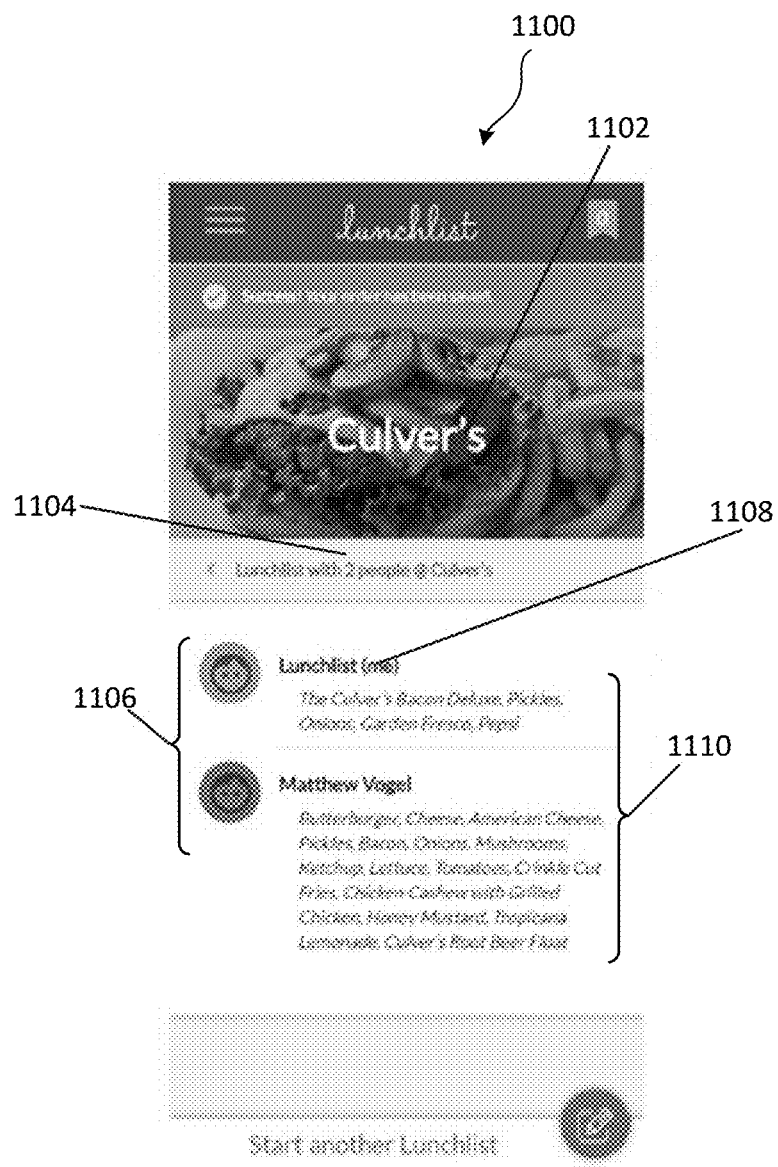
FIG. 11 is an example of a user-interface display usable with the platform service of the present disclosure.

FIG. 11 illustrates an example user-interface display 1100 of the combined order generated by the group selection and order module 620 of the platform service 150 for the management of group orders from third party retail shops. As shown, the user-interface display 1100 includes an identifier of the selected restaurant, e.g., name 1102, an indicator 1104 indicating the number of users included in the combined order, a listing of the users 1106 included in the combined orders as well as indicator 1108 of the order originator, e.g. "(me)", and next to each of the identified users their respective predetermined orders 1110 for the selected restaurant as obtained from the user database 250.

Returning to the flowchart of FIG. 9, upon generation of the combined order, S926, the order originating user can optionally electronically transmit the combined order to the restaurant for preparation and/or can electronically remit payment for the combined ordered to the restaurant or an intermediate party, S928. Alternatively, the user can use the display of the combined order as a reference when placing an order in person at the selected restaurant.

In example additional embodiments, the order originating user may be presented with a number of additional options. For example that user may be requested to provide a rating or review for the restaurant and/or delivery service with which the order was placed, or may be able to share photos or video of various completed orders on social media.

Figure 12:
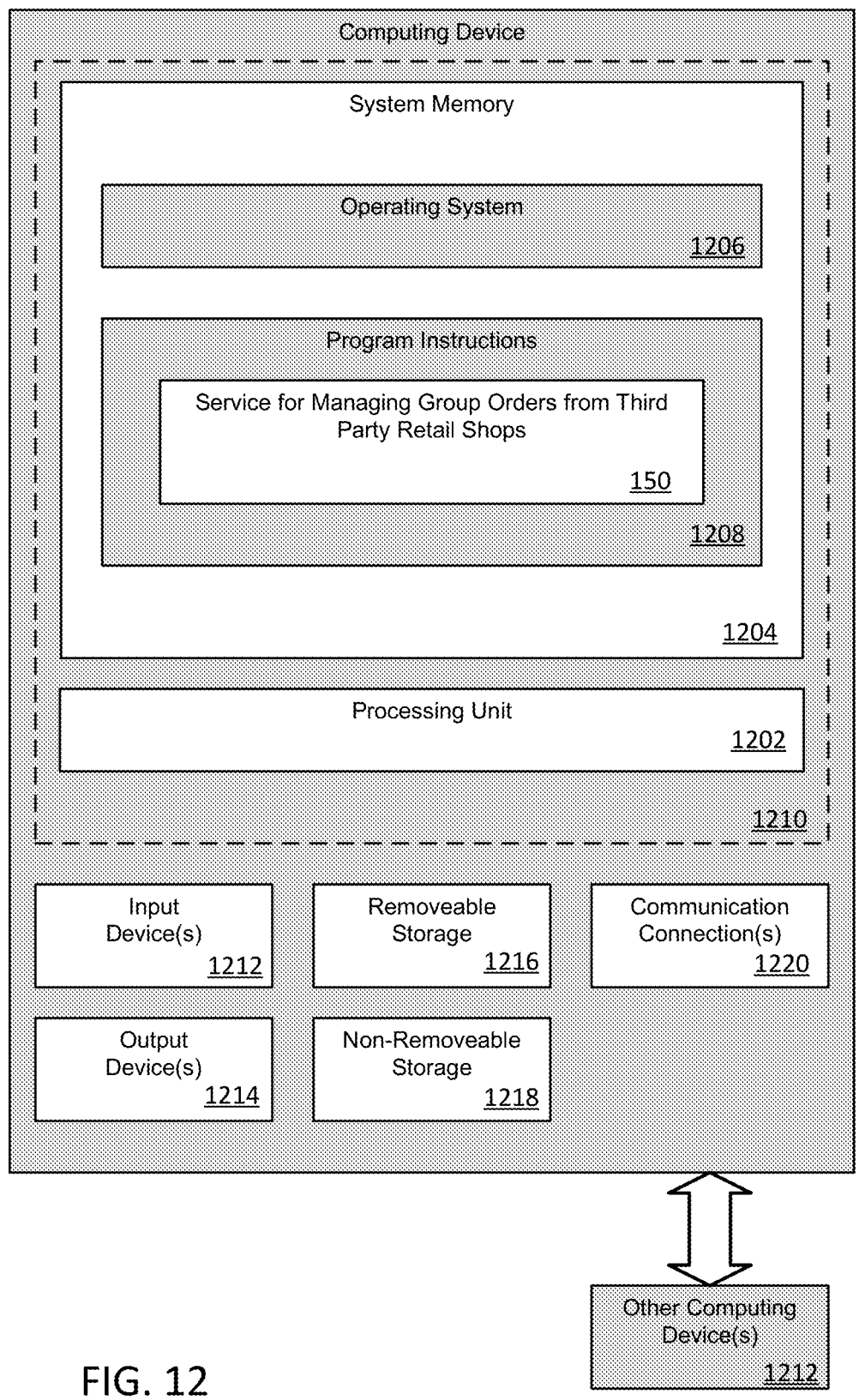
FIG. 12 is a block diagram illustrating physical components of an example computing device with which aspects of the present disclosure can be practiced.

FIG. 12 is a block diagram illustrating physical components of an example computing device with which aspects of the present disclosure may be practiced. The computing device 1200 can include at least one processing unit (processor) 1202 and a system memory 1204. The system memory 1204 may comprise, but is not limited to, volatile (e.g. random access memory (RAM)), non-volatile (e.g. read-only memory (ROM)), flash memory, or any combination thereof. System memory 1204 may include operating system 1206, one or more program instructions 1208, and may include sufficient computer-executable instructions for the platform service 150 for the managing of group orders from third party retail shops, which when executed, perform functionalities as described herein. Operating system 1206, for example, may be suitable for controlling the operation of computing device 1200. Furthermore, aspects may be practiced in conjunction with a graphics library, other operating systems, or any other application program and is not limited to any particular application or system. This basic configuration is illustrated by those components within a dashed line 1210. Computing device 1200 may also include one or more input device(s) 1212 (keyboard, mouse, pen, touch input device, etc.) and one or more output device(s) 1214 (e.g., display, speakers, a printer, etc.).

The computing device 1200 may also include additional data storage devices (removable or non-removable) such as, for example, magnetic disks, optical disks, or tape. Such additional storage is illustrated by a removable storage 1216 and a non-removable storage 1218. Computing device 1200 may also contain a communication connection 1220 that may allow computing device 1200 to communicate with other computing devices 1222, such as over a network in a distributed computing environment, for example, an intranet or the Internet. Communication connection 1220 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media. In at least some embodiments, the computer-readable media comprise at least some tangible media, and in further embodiments, comprise entirely non-transitory media devices.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 1200 or any other computing devices 1222, in combination with computing device 1200, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

The invention claimed is:

1. A method of managing orders from third party retail shops, the method comprising:
    storing in a database one or more predetermined orders for at least a portion of a plurality of users of a platform service, each of the one or more predetermined orders including a default product selection for the user associated with a particular third party retail shop from among a plurality of third party retail shops;

storing, in the database, one or more predetermined ordering groups, the predetermined ordering groups including one or more of the plurality of users;

providing a user interface to a mobile device of an ordering user of the platform service, the user interface including a shop selection screen and a group selection screen;

receiving, associated with the ordering user, a selection of a predetermined ordering group associated with the ordering user, the predetermined ordering group being presented on a group selection screen;

receiving, associated with the ordering user, a selection of a third party retail shop from among the plurality of third party retail shops presented in the shop selection screen and included in the platform; and after receiving both (1) the selection of the third party retail shop and (2) the predetermined ordering group including a plurality of the users of the platform service, generating an order including the product selection associated with the selected third party retail shop for each of the selected one or more users;

wherein the platform service does not require the ordering user to re-select users to be included in a predetermined ordering group and does not require the ordering user or the users in the predetermined ordering group to enter product selections for the users in the predetermined ordering group to be included in the order.

2. The method of claim 1, wherein the plurality of retail shops comprise a plurality of restaurants.

3. The method of claim 2, wherein the product selection comprises a menu item.

4. The method of claim 1, wherein one or more of the plurality of users is established within the platform service through a social media network.

5. The method of claim 1, further comprising electronically submitting the generated order to the selected third party retail shop.

6. The method of claim 5, further comprising submitting electronic payment for the generated order.

7. The method of claim 1, wherein generating the order includes transmitting a group order for display on a user interface of a mobile device of the ordering user.

8. The method of claim 1, further comprising:
transmitting a message to each user in the predetermined ordering group; and
receiving from at least one user in the predetermined ordering group a notification opting in to being included in the order.

9. The method of claim 8, wherein the order includes the product selection and one or more customizations associated with the selected third party retail shop for the at least one user.

10. The method of claim 8, further comprising:
receiving a selection from the ordering user to include a user from the predetermined ordering group in the order despite not receiving a notification opting in to being included in the order from that user.

11. The method of claim 1, further comprising storing one or more customizations associated with the user in the database, and wherein the order includes the one or more customizations.

12. The method of claim 1, wherein receiving the selection of the third party retail shop comprises, upon not receiving a selection from the ordering user within a predetermined amount of time, automatically selecting a third party retail shop on behalf of the ordering user.

13. A method of coordinating orders from a third party retail shop for a plurality of user contacts, the method comprising:
displaying a user interface including a group selection screen that presents a predetermined plurality of users of a platform service on a mobile device of an ordering user;
transmitting, from the mobile device of the ordering user to a platform service, a selection of a predetermined group of users, the predetermined group of users including the ordering user and one or more of the plurality of users of the platform service, wherein the group selection screen does not require the ordering user to re-select users to be included in a predetermined ordering group;
displaying a user interface including a shop selection screen that presents a plurality of third party retail shops included in the platform service;
transmitting, from the mobile device of the ordering user to the platform service, a selection of a third party retail shop from among a plurality of third party retail shops included in the platform service; and
receiving an order including a previously-selected product associated with the selected third party retail shop for each of the selected one or more users based on information in a database, without requiring each of the selected one or more associated users to re-enter the product after the selection of the third party retail shop by the ordering user.

14. The method of claim 11, wherein the order is associated with fewer than all of the selected one or more users based on which of the one or more users indicates interest in inclusion in the order.

15. The method of claim 11, further comprising electronically transmitting, from the mobile device to the third party retail shop, payment for the order.

16. The method of claim 11, further comprising displaying the order on a display of the mobile device.

17. A mobile device comprising:
a programmable circuit;
a memory communicatively connected to the programmable circuit storing instructions which, when executed by the programmable circuit, cause the mobile device to:
display a user interface including a group selection screen that presents a predetermined plurality of users of a platform service on a mobile device of an ordering user;
transmit, from the mobile device of the ordering user to a platform service, a selection of a predetermined group of users, the predetermined group of users including the ordering user and one or more of the plurality of users of the platform service, wherein the group selection screen does not require the ordering user to re-select users to be included in a predetermined ordering group;
display a user interface including a shop selection screen that presents a plurality of third party retail shops included in the platform service
transmit, from the mobile device of the ordering user to the platform service, a selection of a third party retail shop from among a plurality of third party retail shops included in the platform service; and
receive an order including a previously-selected product and one or more customizations associated with the selected third party retail shop for each of the selected one or more users based on information in a database, without requiring each of the selected one or more associated users to re-enter the product or the one or more customizations after the selection of the third party retail shop by the ordering user.

18. The mobile device of claim 17, wherein the user interface including the group selection screen includes a shop search bar.

19. The mobile device of claim 17, wherein the user interface including the shop selection screen includes a user search bar.

* * * * *